United States Patent Office 2,905,671
Patented Sept. 22, 1959

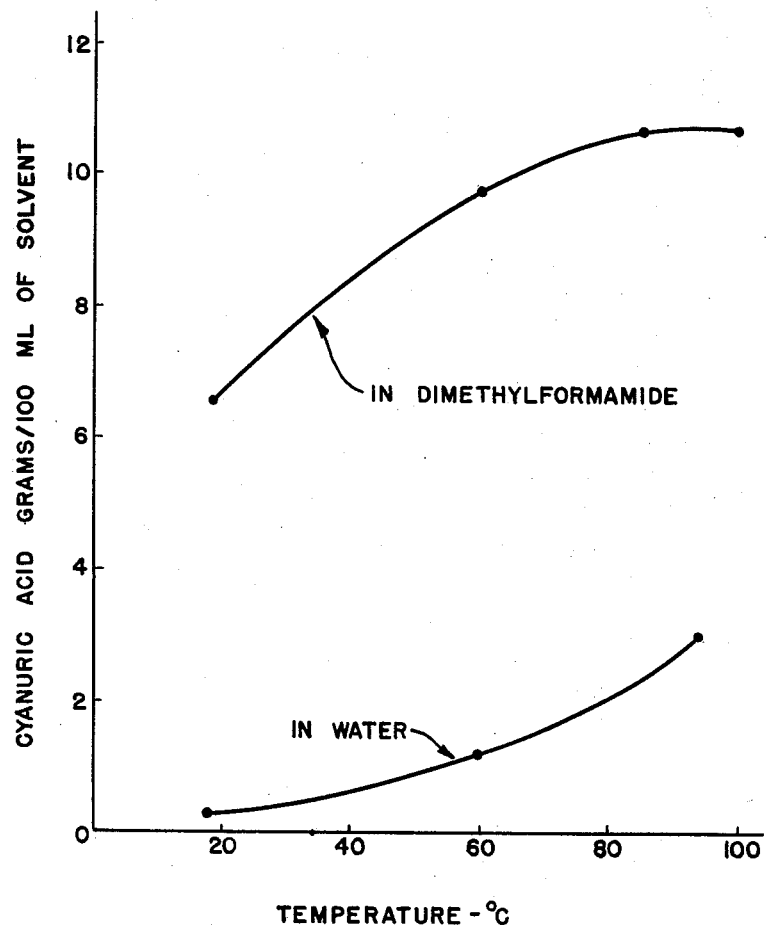
SOLUBILITY OF CYANURIC ACID
IN WATER AND DIMETHYLFORMAMIDE

2,905,671

PURIFICATION OF CYANURIC ACID

John D. Christian and Edwin W. Lard, Memphis, Tenn., assignors to W. R. Grace & Co., New York, N.Y., a corporation of Connecticut Application February 25, 1957, Serial No. 642,297

3 Claims. (Cl. 260—248)

This invention relates to an improved method of purifying cyanuric acid. An object of the present invention is to provide a class of solvents for cyanuric acid having greater dissolving power than those presently known. Another object of this invention is to separate cyanuric acid from ammelide. Additional objects will be evident from the following description of the invention.

A common method of preparing cyanuric acid is simply to fuse urea above the temperature range in which it decomposes, and preferably above about 190° C. Fluxes or catalysts such as ammonium chloride or zinc chloride may be used in such fusion processes for increased yields. Such methods are old in the art and are described in the Journal of the Society of Chemical Industries, vol. 67, p. 66 (1948), and in U.S. Patent No. 2,527,316, issued October 24, 1950 to Johnstone S. Mackay. All such methods give a crude cyanuric acid product containing ammelide as a major impurity, often to the extent of 25% or more. Small amounts of other water-insoluble material, such as triuret, tetrauret, etc., may also be formed. Present methods used to recover the cyanuric acid from such crude reaction masses involve leaching the acid out with boiling water and thereafter allowing it to crystallize from the filtrate on cooling. This aqueous leach has disadvantages in that cyanuric acid has low solubility in water, even in hot water, and also in that ammelide particles although substantially insoluble in water have a tendency to disintegrate to collodial dimensions (peptization) rendering filtration slow and mechanically difficult. Furthermore, in the hot-water method of recovering cyanuric acid, some product is always lost by hydrolysis to ammonia and carbon dioxide.

It has now been found that the N,N-dialkylformamides are excellent solvents for cyanuric acid and that they do not peptize ammelide or other insoluble matter during the leaching process. Furthermore, they do not react with cyanuric acid to any noticeable degree. Recovery of cyanuric acid from their solutions can be accomplished by cooling or through the addition of a third component which reduces the solubility of cyanuric acid. Urea and biuret are both more soluble in the dialkylformamides than is cyanuric acid, so that they are leached out of the crude product along with cyanuric acid. However, owing to their greater solubility, they remain in the filtrate solution when it is cooled or otherwise treated to precipitate pure cyanuric acid.

A comparison of the solubility of cyanuric acid in water and dimethylformamide is shown in Figure 1.

The following examples illustrate without limiting the invention. The preferred dialkyl formamide is dimethylformamide, but diethylformamide and the other di-lower alkyl formamides may also be used with good results. Example 1 illustrates the comparative effectiveness of dimethylformamide and $H_2O$ extraction. Example 2 demonstrates the use of a third component to increase the recovery.

Example 1

In order to compare the effectiveness of $H_2O$ and dimethylformamide extraction, two identical Soxhlet extractor units of the usual type were assembled. One unit was charged with an extraction thimble containing crude cyanuric acid (43.40 g., analyzing 62.5% cyanuric acid, 10.2% urea, 1.3% biuret, and 26% ammelide), and dimethylformamide (150 ml.) in the reboiler flask. Similarly, into the other extractor unit was placed another sample of the crude cyanuric acid (40.13 g., same analysis as above) and distilled water (150 ml.). The units were placed in operation (reflux) overnight, for a total of about 18 hours. At the end of this time the return stream from the thimble chamber to the reboiler flask in the water extraction unit was observed to contain a suspension of white particles of ammelide. The dimethylformamide extraction operation at no time displayed a similar tendency toward peptization of ammelide or other insoluble material. The extraction thimble from the dimethylformamide unit retained all of the original ammelide (plus a minute quantity of undissolved cyanuric acid), while only 6.19 g. of ammelide was retained in the water-extracted thimble, the balance having passed through the thimble wall. Crystals deposited in good yield by the cold dimethylformamide were identified by an infrared spectrogram as pure cyanuric acid.

Example 2

Crude cyanuric acid (300.5 g. analyzing 70% cyanuric acid, 1.7% urea, 0.5% biuret, and 27.8% ammelide) was subjected to continuous extraction by a refluxing stream of dimethylformamide (750 ml.) over a period of 36 hours. The insoluble residue remaining after this extraction (86.5 g.) included substantially all of the ammelide in the original feed. The cyanuric acid was partially recovered by cooling of the extractant dimethylformamide which resulted in the deposition of crystals. This was supplemented by a second crystalline fraction precipitated by the addition of carbon tetrachloride (500 ml.) to the dimethylformamide solution. A total recovery of cyanuric acid of 191.4 g. (91% of theory) was accomplished. Instead of carbon tetrachloride, various other nonsolvents for cyanuric acid may be used, such as chloroform, benzene, water, etc.

We claim:

1. In the method of separating cyanuric acid from a mixture thereof with ammelide, urea, and biuret, the steps of leaching the mixture with N,N-dimethylformamide whereby the cyanuric acid dissolves in the N,N-dimethylformamide without substantial peptization of the ammelide, separating the cyanuric acid-containing solution from the ammelide, and recovering cyanuric acid from the solution.

2. In the method of separating cyanuric acid from a mixture thereof with ammelide, urea, and biuret, the steps of leaching the mixture with boiling N,N-dimethylformamide whereby the cyanuric acid dissolves without substantial peptization of ammelide, separating cyanuric acid-N,N-dimethylformamide solution from ammelide residue, cooling the cyanuric acid solution to precipitate substantially pure crystals of cyanuric acid in the N,N-dimethylformamide, and recovering the thus precipitated crystals.

3. In the method of separating cyanuric acid from a mixture thereof with ammelide, urea, and biuret, the steps of leaching the mixture with N,N-dimethylformamide to provide a solution of cyanuric acid in N,N-dimethylformamide without substantial peptization of ammelide, separating the cyanuric acid-containing solution from the ammelide residue, adding carbon tetrachloride to the cyanuric acid-containing solution to precipitate substantially pure crystals of cyanuric acid, and recovering the thus precipitated cyanuric acid.

References Cited in the file of this patent

UNITED STATES PATENTS

| | | |
|---|---|---|
| 2,712,002 | Lundberg | June 28, 1955 |
| 2,790,801 | Marullo | Apr. 30, 1957 |
| 2,794,831 | McKinnis | June 4, 1957 |

OTHER REFERENCES

Technique of Organic Chemistry, vol. 1, 7 (Weisberger et al.: "Organic Solvents," 2nd ed.), Interscience Publishers, 1955, pp. 447–450.

Fieutes and Fieutes: Organic Chemistry, 3rd edition, p. 179, Reinhold Publishing Corporation (1956).